United States Patent
Wiel et al.

(10) Patent No.: US 10,926,525 B2
(45) Date of Patent: Feb. 23, 2021

(54) DEVICE FOR DEPOSITING A BED OF POWDER ON A SURFACE, SAID DEVICE BEING PROVIDED WITH AN ELECTROMAGNETIC-RESPONSE PROBE, AND CORRESPONDING METHOD

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Pierre Wiel, Clermont-Ferand (FR); Jamasp Jhabvala, Lausanne (CH); Eric Boillat, Crissier (CH); Gilles Santi, Lausanne (CH); David Hippert, Grand-Lancy (CH)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 78 days.

(21) Appl. No.: 14/917,397

(22) PCT Filed: Sep. 9, 2014

(86) PCT No.: PCT/EP2014/069185
§ 371 (c)(1),
(2) Date: Mar. 8, 2016

(87) PCT Pub. No.: WO2015/032974
PCT Pub. Date: Mar. 12, 2015

(65) Prior Publication Data
US 2016/0214319 A1    Jul. 28, 2016

(30) Foreign Application Priority Data

Sep. 9, 2013 (FR) ........................... 1358611

(51) Int. Cl.
*B33Y 10/00* (2015.01)
*B22F 3/105* (2006.01)
(Continued)

(52) U.S. Cl.
CPC ............ *B33Y 10/00* (2014.12); *B22F 3/1055* (2013.01); *B29C 64/153* (2017.08); *B33Y 30/00* (2014.12);
(Continued)

(58) Field of Classification Search
CPC ................ B29C 64/153; B29C 64/386; G01K 2213/00; G01K 2011/324;
(Continued)

(56) References Cited

U.S. PATENT DOCUMENTS 6,930,278 B1    8/2005  Chung et al.
2002/0104973 A1*  8/2002  Kerekes ................. B29C 64/40
                                            250/559.2
(Continued)

FOREIGN PATENT DOCUMENTS

DE    202010010771 U1    11/2011
DE    102011111818 A1     2/2013
(Continued)

OTHER PUBLICATIONS

Craeghs, T., Clijsters, S., Yasa, E. and Kruth, J.P., 2011, August. Online quality control of selective laser melting. In Proceedings of the Solid Freeform Fabrication Symposium, Austin, TX (pp. 212-226).<https://sffsymposium.engr.utexas.edu/Manuscripts/2011/2011-17-Craeghs.pdf> (Year: 2011).*

(Continued)

*Primary Examiner* — Leith S Shafi
*Assistant Examiner* — Nicholas R Krasnow
(74) *Attorney, Agent, or Firm* — Dickinson Wright PLLC

(57) ABSTRACT

A device and corresponding method for depositing a powder bed on a surface (1) is provided. The device comprises a (Continued)

deposition module (2) configured in order to scan the surface while delivering the powder onto the surface. The deposition module has at least one electromagnetic-response probe (5) capable of analysing a delivered portion (6) of the powder bed. The invention finds an application in sintering or selective laser melting machines.

7 Claims, 2 Drawing Sheets

(51) Int. Cl.
  B29C 64/153 (2017.01)
  B33Y 30/00 (2015.01)
  B33Y 50/02 (2015.01)
(52) U.S. Cl.
  CPC ....... B33Y 50/02 (2014.12); *B22F 2003/1056* (2013.01); *B22F 2003/1057* (2013.01); *Y02P 10/25* (2015.11)
(58) Field of Classification Search
  CPC ......... G01K 2011/322; G01K 11/3213; G01K 11/3206; G01K 7/38
  See application file for complete search history.

(56) References Cited

U.S. PATENT DOCUMENTS

| | | | | |
|---|---|---|---|---|
| 2004/0004303 A1* | 1/2004 | Iskra | ................ | B22F 3/1055 264/109 |
| 2004/0018107 A1* | 1/2004 | Khoshnevis | ........... | B33Y 30/00 419/6 |
| 2004/0200816 A1* | 10/2004 | Chung | ............... | G05D 23/1919 219/121.83 |
| 2006/0119012 A1* | 6/2006 | Ruatta | ................ | C23C 24/10 264/497 |
| 2007/0176312 A1* | 8/2007 | Clark | ................ | B22F 3/1055 264/40.1 |
| 2009/0206065 A1* | 8/2009 | Kruth | ................ | B29C 64/153 219/121.66 |
| 2015/0273583 A1* | 10/2015 | Bumgardner | ........ | B22F 3/1055 419/53 |
| 2016/0339519 A1* | 11/2016 | Sargent | ................ | B22F 3/1055 |
| 2016/0349215 A1* | 12/2016 | Todorov | ................ | B33Y 50/02 |

FOREIGN PATENT DOCUMENTS

| | | |
|---|---|---|
| WO | 2007147221 A1 | 12/2007 |
| WO | 2012100766 A1 | 8/2012 |

OTHER PUBLICATIONS

Krauss, H., Eschey, C. and Zaeh, M., 2012, August. Thermography for monitoring the selective laser melting process. In Proceedings of the Solid Freeform Fabrication Symposium (pp. 999-1014). (Year: 2012).*
Haddad ("Monitoring of metal powder by eddy current", NPL 2010) URL=https://www.researchgate.net/publication/249922095 (Year: 2010).*
Wadley, H.N.G., Kahn, A.H., Gefen, Y. and Mester, M., 1988. Eddy current measurement of density during hot isostatic pressing. In Review of Progress in Quantitative Nondestructive Evaluation (pp. 1589-1598). Springer, Boston, MA. (Year: 1988).*
Yang et al: "Metering and dispensing of powder; the quest for new wolid freeforming techniques", Powder Technology, Elsevier Sequoia, Lausanne, CH, vol. 178, No. 1, Aug. 16, 2007 (Aug. 16, 2007), pp. 56-72, XP022202413, ISSN: 0032-5910, DOI: 10.10161J. POWTEC. 2007.04.004 le document en entier.
International Search Report dated Feb. 16, 2015.

* cited by examiner

DEVICE FOR DEPOSITING A BED OF POWDER ON A SURFACE, SAID DEVICE BEING PROVIDED WITH AN ELECTROMAGNETIC-RESPONSE PROBE, AND CORRESPONDING METHOD

This application is a 371 national phase entry of PCT/EP2014/069185, filed 9 Sep. 2014, which claims benefit of French Patent Application No. 1358611, filed 9 Sep. 2013, the entire contents of which are incorporated herein by reference for all purposes.

BACKGROUND

1. Field

The invention relates to powder beds, and in particular to determination of the density and the defects inside a powder bed.

2. Description of Related Art

Powder beds are used in sintering machines, or alternatively in selective laser melting (SLM) machines.

The density and the homogeneity of the powder bed in such machines is particularly important for the success of the manufacture of an item. This being the case, it is particularly complicated to determine the properties of a powder bed without destroying it during the measurement.

Measurements by weighing a given volume of the powder bed are known from the prior art, but this technique has the drawback of destroying the powder bed.

Methods have therefore been proposed for nondestructively analysing powder beds. Reference may be made to the documents EP 1 915 936 and WO 2012/100766, which describe a measurement by eddy currents of a layer solidified by selective laser melting.

Reference may also be made to the document US 2006/0127267, which describes a method for determining the density of a powder by eddy currents by means of a coil arranged around a receptacle containing the powder.

The solutions described in the prior art do not make it possible to analyse powder beds without destroying them, or to analyse them before their solidification.

SUMMARY

The object of the invention is therefore to provide a device making it possible to obtain a powder bed as well as to analyse this powder bed prior to its solidification.

One aspect provides a device for depositing a powder bed on a surface, the device comprising a deposition module configured in order to scan the surface while delivering the powder onto the surface.

According to a general embodiment of the invention, the deposition module has at least one electromagnetic-response probe capable of analysing a delivered portion of the powder bed.

Thus, in contrast to the solutions of the prior art, it is directly on a deposition module, for example an arm which scans the surface, that a probe is arranged. The probe can thus be used as soon as the powder is deposited.

The use of an electromagnetic-response probe is particularly advantageous since it makes it possible to analyse the powder bed without destroying it.

The probe may be capable of analysing a strip of the powder bed during the scan of the surface.

Thus, information is obtained over the entire zone that can be scanned by the probe which follows the movement of the deposition module. The strip then has a width corresponding to the width of the portion that the electromagnetic-response probe used can analyse.

The deposition module may be configured in order to scan the surface in one direction from an initial position while delivering powder, and in order to scan the surface in the opposite direction in order to return to the initial position, the probe being capable of analysing the same strip of the powder bed during each scan.

A better analysis of a strip of the powder bed, which is analysed twice, is thus obtained.

The module may have a plurality of probes capable of analysing different delivered powder bed portions.

For example, a plurality of regularly aligned probes may be put in place in order to cover and analyse all of the powder bed in one scan.

Another aspect provides a sintering or selective laser melting machine comprising a powder bed deposition device as defined above and means for solidifying a part of the powder bed, and having a processor capable of using the information provided by the said at least one probe in order to control the solidification means.

Thus, the information provided by the probe or probes may be taken into consideration in order to adapt the melting of the powder bed. In particular, the variations in density or homogeneity may be taken into account in order, for example, to adapt the melting time. Better sintering, or better selective laser melting, is thus obtained, which can in particular lead to objects with better quality.

Yet another aspect provides a method for depositing a powder bed on a surface, comprising a scan of the surface during which powder is delivered onto the surface.

According to a general characteristic, the method comprises at least one analysis of a delivered powder bed portion by measuring the electromagnetic field.

The measurement of the electromagnetic field may be carried out by means of an electromagnetic-response probe.

A strip of the powder bed may be analysed during the scan of the surface.

It is possible to scan the surface in one direction from an initial position while delivering the powder, scan the surface in the opposite direction in order to return to the initial position, and analyse the same strip of the powder bed during each scan.

Different delivered powder bed portions may be analysed simultaneously.

The method may furthermore comprise sintering or selective laser melting, wherein a part of the powder bed is solidified, and wherein the solidification is controlled on the basis of information provided by the said at least one analysis.

BRIEF DESCRIPTION OF THE DRAWINGS

Other objects, characteristics and advantages will become apparent on reading the following description, given solely by way of nonlimiting example and provided with reference to the appended figures, in which.

DETAILED DESCRIPTION OF THE SPECIFIC EMBODIMENTS

Figure 1:
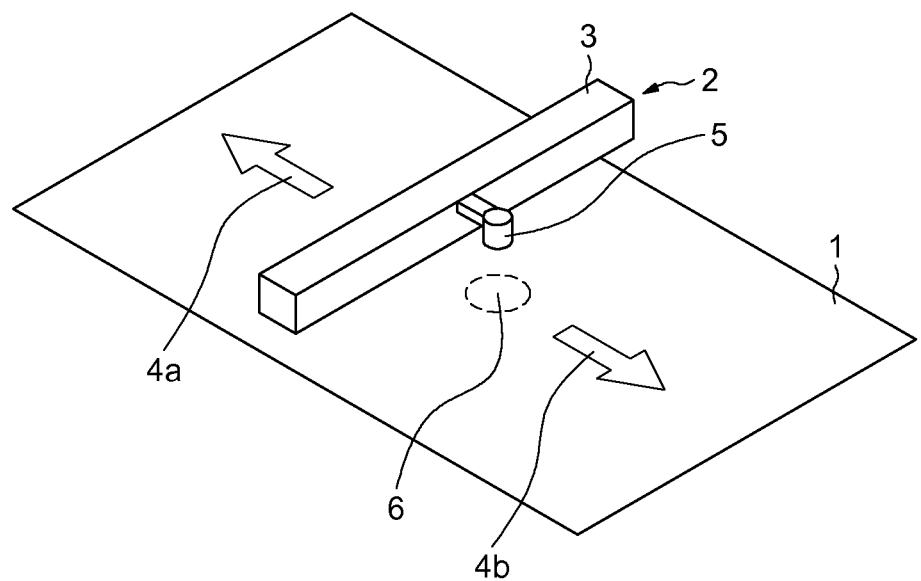
FIGS. 1 and 2 schematically illustrate two embodiment of deposition devices according to embodiments of the invention, and FIG. 3 schematically illustrates a sintering or selective laser melting machine according to another embodiment of the invention.

FIG. 1 represents a surface 1 which is intended to be covered with a powder bed, for example with a view to subsequent sintering or selective laser melting. The formation of the powder bed is obtained by scanning the surface 1 by means of a deposition module 2, which scans the surface 1 while delivering powder.

The deposition module 2 comprises an arm 3 which can be driven in longitudinal translation in the two directions indicated by the arrows 4a and 4b. The arm 3 comprises means for delivering powder onto the surface. The deposition of the powder may, for example, be carried out from an initial position located on the right in the figure, then, by moving in the direction of the arrow 4a, the arm may cover the surface 1 with powder as far as the left-hand end of the surface 1. The arm may then return to its initial position by moving in the opposite direction, in the direction of the arrow 4b (without delivering powder).

In order to analyse the characteristics of the powder bed, it is particularly advantageous to place an electromagnetic-response probe 5 directly inside the deposition module 2 on the arm 3. The probe can thus analyse a portion 6 of the powder bed which has just been delivered. To this end, the probe is placed on the side of the deposition module corresponding to the side from which the deposition module is coming, here on the right in the figure.

As a variant, the probe may analyse a strip of the powder bed, by analysing successive portions while the arm is moving in order to deliver the powder, which will subsequently be analysed.

A device for depositing a powder bed on the surface 1 is thus obtained which can analyse the obtained powder bed by means of the electromagnetic-response probe 5.

It should be noted that it is preferable to use magnetic powders, for example comprising iron or any other material suitable for the use of an electromagnetic-response probe.

Figure 2:
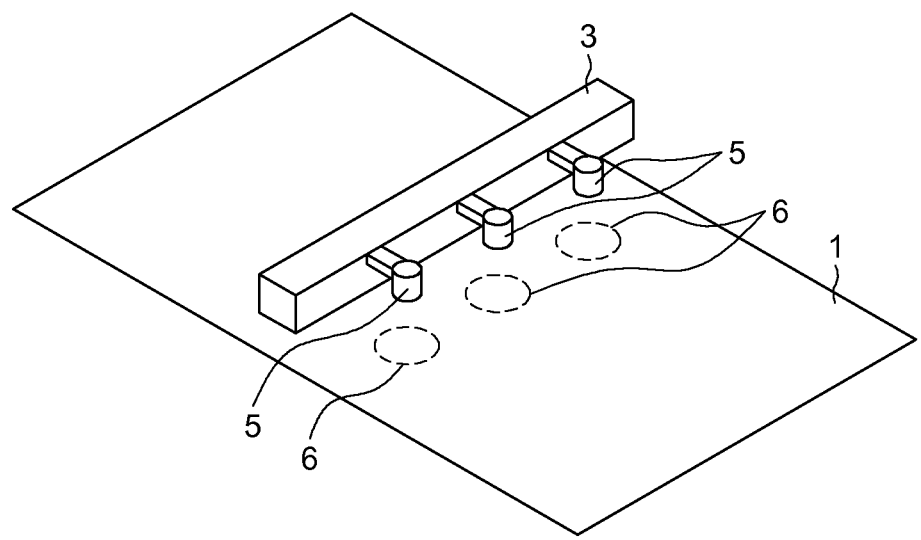

FIG. 2 represents a variant of the invention in which the arm 3 is provided with a plurality of electromagnetic-response probes 5.

Each probe 5 can analyse a portion of the powder bed 6. As can be seen in FIG. 2, the probes may be arranged regularly in order to cover a plurality of adjacent portions 6. By increasing the number of probes 5, it is possible to cover a transverse strip, and all of the powder bed can be analysed during the scan carried out by the arm 3.

Figure 3:
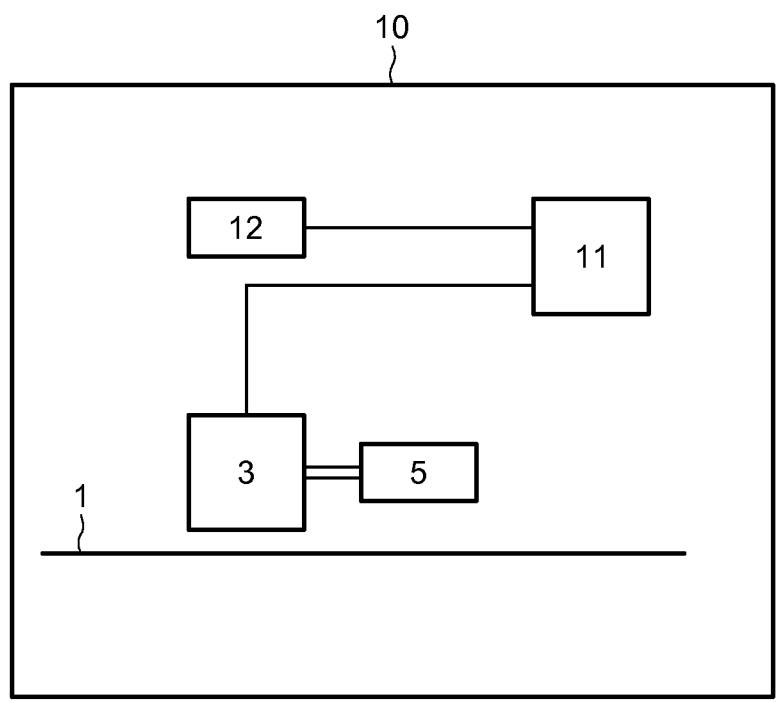

FIG. 3 represents a machine 10, for example a sintering or selective laser melting machine. The machine 10 may comprise a deposition device similar to the one described with reference to FIGS. 1 and 2. More precisely, the machine 10 may comprise a surface 1, an arm 3, and at least one electromagnetic-response probe 5.

After a powder bed portion, a strip of the powder bed, or all of the powder bed, has been analysed, the data obtained by these analyses, relating for example to the density or the homogeneity of the powder bed, are processed by a processor 11.

The processor 11 may, for example, be a calculation unit comprising means for storing the results of the analyses and for processing these results.

The machine 10 may comprise solidification means 12 for solidifying at least a part of the deposited powder bed. By way of indication, the solidification means may comprise a laser-beam apparatus.

The solidification means 12 may be controlled by the processor 11. It is thus possible to use the results of the electromagnetic analyses in order to adapt the parameters of a subsequent solidification step. The subsequent solidification step is then carried out while taking the defects of the powder bed into consideration.

It will be noted that the electromagnetic-response probe 5 may be a coil, the change in impedance of which is measured. It is thus possible to use eddy-current probes.

Of course, the step of measuring the electromagnetic field in the method according to an embodiment of the invention may be carried out by means of an electromagnetic-response probe, for example a coil, the change in impedance of which is measured. It is also possible to use eddy-current probes.

By virtue of an embodiment the invention, an analysis of powder beds is obtained which is obtained as soon as the deposition has been carried out.

The information obtained by these analyses can make it possible to improve the subsequent steps of sintering or selective laser melting, which makes it possible to obtain better solids.

The invention claimed is:

1. A method for depositing a powder bed on a surface, the method comprising delivering powder onto the surface by an arm driven longitudinal along the surface, the method further comprising a scan of the surface during which the powder is delivered onto the surface, wherein an electromagnetic-response probe including a coil performs at least one analysis of characteristics and/or defects inside at least one portion of the delivered powder bed, and the analysis includes measuring a change in impedance of the coil, the electromagnetic-response probe being placed directly on the arm such that the electromagnetic-response probe is driven with the arm longitudinally along the surface, the at least one analysis of characteristics and/or defects inside the at least one portion of the delivered powder bed occurs before solidification of the at least one portion of the delivered powder bed, the method includes determining at least the density of the delivered powder bed based on the change in impedance measured, and using results of the at least one analysis to adapt at least one characteristic of the subsequent solidification of the at least one portion of the delivered powder bed, and wherein the at least one characteristic of the subsequent solidification step includes a melting time of at least a portion of the powder bed.

2. A method for depositing a powder bed on a surface, the method comprising delivering powder onto the surface by an arm driven longitudinal along the surface, the method further comprising a scan of the surface during which the powder is delivered onto the surface, wherein an electromagnetic-response probe including a coil performs at least one analysis of characteristics and/or defects inside at least one portion of the delivered powder bed, and the analysis includes measuring a change in impedance of the coil, the electromagnetic-response probe being placed directly on the arm such that the electromagnetic-response probe is driven with the arm longitudinally along the surface, the at least one analysis of characteristics and/or defects inside the at least one portion of the delivered powder bed occurs before solidification of the at least one portion of the delivered powder bed, the method includes determining at least the density of the delivered powder bed based on the change in impedance measured, and using results of the at least one analysis to adapt at least one characteristic of the subsequent solidification of the at least one portion of the delivered powder bed, wherein a strip of the powder bed is analysed during the scan of the surface.

3. A method according to claim 2, wherein the surface is scanned in one direction from an initial position while delivering the powder, the surface is scanned in the opposite direction in order to return to the initial position, and the same strip of the powder bed is analysed during each scan.

4. A method according to claim 1, wherein different delivered powder bed portions are analysed simultaneously.

5. A method for depositing a powder bed on a surface, the method comprising delivering powder onto the surface by an arm driven longitudinal along the surface, the method further comprising a scan of the surface during which the powder is delivered onto the surface, wherein an electromagnetic-response probe including a coil performs at least one analysis of characteristics and/or defects inside at least one portion of the delivered powder bed, and the analysis includes measuring a change in impedance of the coil, the electromagnetic-response probe being placed directly on the arm such that the electromagnetic-response probe is driven with the arm longitudinally along the surface, the at least one analysis of characteristics and/or defects inside the at least one portion of the delivered powder bed occurs before solidification of the at least one portion of the delivered powder bed, the method includes determining at least the density of the delivered powder bed based on the change in impedance measured, and using results of the at least one analysis to adapt at least one characteristic of the subsequent solidification of the at least one portion of the delivered powder bed, furthermore comprising sintering or selective laser melting, wherein a part of the powder bed is solidified, and wherein the solidification is controlled on the basis of information provided by said at least one analysis.

6. A method according to claim 1, wherein the solidification includes sintering or melting the powder to form a solid object.

7. A method for depositing a powder bed on a surface, the method comprising delivering powder onto the surface by an arm driven longitudinal along the surface, the method further comprising a scan of the surface during which the powder is delivered onto the surface, wherein an electromagnetic-response probe including a coil performs at least one analysis of characteristics and/or defects inside at least one portion of the delivered powder bed, and the analysis includes measuring a change in impedance of the coil, the electromagnetic-response probe being placed directly on the arm such that the electromagnetic-response probe is driven with the arm longitudinally along the surface, the at least one analysis of characteristics and/or defects inside the at least one portion of the delivered powder bed occurs before solidification of the at least one portion of the delivered powder bed, the method includes determining at least the density of the delivered powder bed based on the change in impedance measured, and using results of the at least one analysis to adapt at least one characteristic of the subsequent solidification of the at least one portion of the delivered powder bed, the solidification including sintering or melting the powder to form a solid object, wherein the solidification includes melting by a laser.

* * * * *